United States Patent
Coimbra De Andrade

(10) Patent No.: US 11,501,511 B2
(45) Date of Patent: Nov. 15, 2022

(54) METHOD FOR OPTICAL RECOGNITION OF MARKERS

(71) Applicant: PETRÓLEO BRASILEIRO S.A.—PETROBRAS, Rio de Janeiro (BR)

(72) Inventor: Douglas Coimbra De Andrade, Conselheiro Lafaiete (BR)

(73) Assignee: Petróleo Brasileiro S.A.—Petrobras, Rio de Janeiro (BR)

(*) Notice: Subject to any disclaimer, the term of this patent is extended or adjusted under 35 U.S.C. 154(b) by 0 days.

(21) Appl. No.: 16/970,919

(22) PCT Filed: Feb. 19, 2019

(86) PCT No.: PCT/GB2019/050442
§ 371 (c)(1),
(2) Date: Aug. 18, 2020

(87) PCT Pub. No.: WO2019/158951
PCT Pub. Date: Aug. 22, 2019

(65) Prior Publication Data
US 2021/0192256 A1  Jun. 24, 2021

(30) Foreign Application Priority Data
Feb. 19, 2018  (BR) .......................... 1020180031252

(51) Int. Cl.
*G06V 10/24* (2022.01)
*G06T 7/12* (2017.01)
(Continued)

(52) U.S. Cl.
CPC .............. *G06V 10/245* (2022.01); *G06T 7/12* (2017.01); *G06T 7/13* (2017.01); *G06V 20/13* (2022.01);
(Continued)

(58) Field of Classification Search
CPC .. G06K 9/3216; G06K 9/0063; G06K 9/3258; G06K 2009/3225; G06K 9/4652;
(Continued)

(56) References Cited

U.S. PATENT DOCUMENTS

| 8,963,957 B2 | 2/2015 | Skarulis | |
| 2005/0269495 A1* | 12/2005 | Kakemizu | B82Y 35/00 850/10 |

(Continued)

FOREIGN PATENT DOCUMENTS

| EP | 1720131 | 11/2006 |
| WO | WO 2015176163 | 11/2015 |

OTHER PUBLICATIONS

Anonymous: "Flood fill—Wikipedia", Jan. 23, 2018 (Jan. 23, 2018), XP055593038, Retrieved from the Internet: URL:https://en.wikipedia.org/w/index.php?t itle=Floodfill&oldid=821946307 [retrieved—on Sep. 10, 2020], 7 pages.

(Continued)

*Primary Examiner* — Ming Y Hon
(74) *Attorney, Agent, or Firm* — Mintz Levin Cohn Ferris Glovsky and Popeo, P.C.

(57) ABSTRACT

The present invention relates to a robust method for optical recognition of markers in an outdoor environment. In this context, the present invention provides a method for optical recognition of optical markers comprising the steps of: acquiring an image; identifying regions of contiguous colours in the image by flood filling; extracting data and parameters of the contiguous regions; and detecting an optical marker by means of a convex hull algorithm and prediction of position of squares based on the data and parameters extracted from the contiguous Thus, the method of the present invention allows identification of markers, such as chequerboards and targets, unequivocally and with (Continued)

enough robustness as regards partial occlusions and variations of illumination.

8 Claims, 19 Drawing Sheets

(51) Int. Cl.
G06T 7/13 (2017.01)
G06V 20/13 (2022.01)
G06V 20/62 (2022.01)

(52) U.S. Cl.
CPC .... *G06V 20/63* (2022.01); *G06T 2207/30204* (2013.01)

(58) Field of Classification Search
CPC ........ G06K 9/00624; G06K 9/46; G06T 7/12; G06T 7/13; G06T 2207/30204
See application file for complete search history.

(56) References Cited

U.S. PATENT DOCUMENTS

| | | | |
|---|---|---|---|
| 2007/0104389 A1* | 5/2007 | Wells | G06T 5/008 |
| | | | 382/274 |
| 2016/0035108 A1* | 2/2016 | Yu | A61B 34/20 |
| | | | 382/131 |
| 2017/0035382 A1* | 2/2017 | Zhang | A61B 6/547 |
| 2017/0221226 A1* | 8/2017 | Shen | G06T 7/80 |
| 2018/0235566 A1* | 8/2018 | Tamersoy | A61B 6/4458 |
| 2019/0328466 A1* | 10/2019 | Schwägli | G06T 7/73 |

OTHER PUBLICATIONS

Baglodi, "Edge detection comparison study and discussion of a new methodology", In: IEEE Southeastcon, 1 page, 2009.
Coimbra de Andrade et al., "A robust methodology for outdoor optical mark recognition", Journal of the Brazilian Society of Mechanical Sciences and Engineering vol. 39, p. 3103-3120, 2017.
Malik, "Robust registration of virtual objects for real-time augmented reality", UMI, National Library of Canada, 96 pages, 2002.

* cited by examiner

Fig. 1b

| 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 15 | 16 | 17 | 18 | 19 | 20 | 21 | 22 | 23 | 24 | 25 | 26 | 27 | 28 | 29 |
| 30 | 31 | 32 | 33 | 34 | 35 | 36 | 37 | 38 | 39 | 40 | 41 | 42 | 43 | 44 |
| 45 | 46 | 47 | 48 | 49 | 50 | 51 | 52 | 53 | 54 | 55 | 56 | 57 | 58 | 59 |
| 60 | 61 | 62 | 63 | 64 | 65 | 66 | 67 | 68 | 69 | 70 | 71 | 72 | 73 | 74 |
| 75 | 76 | 77 | 78 | 79 | 80 | 81 | 82 | 83 | 84 | 85 | 86 | 87 | 88 | 89 |
| 90 | 91 | 92 | 93 | 94 | 95 | 96 | 97 | 98 | 99 | 100 | 101 | 102 | 103 | 104 |
| 105 | 106 | 107 | 108 | 109 | 110 | 111 | 112 | 113 | 114 | 115 | 116 | 117 | 118 | 119 |
| 120 | 121 | 122 | 123 | 124 | 125 | 126 | 127 | 128 | 129 | 130 | 131 | 132 | 133 | 134 |
| 135 | 136 | 137 | 138 | 139 | 140 | 141 | 142 | 143 | 144 | 145 | 146 | 147 | 148 | 149 |
| 150 | 151 | 152 | 153 | 154 | 155 | 156 | 157 | 158 | 159 | 160 | 161 | 162 | 163 | 164 |
| 165 | 166 | 167 | 168 | 169 | 170 | 171 | 172 | 173 | 174 | 175 | 176 | 177 | 178 | 179 |
| 180 | 181 | 182 | 183 | 184 | 185 | 186 | 187 | 188 | 189 | 190 | 191 | 192 | 193 | 194 |
| 195 | 196 | 197 | 198 | 199 | 200 | 201 | 202 | 203 | 204 | 205 | 206 | 207 | 208 | 209 |
| 210 | 211 | 212 | 213 | 214 | 215 | 216 | 217 | 218 | 219 | 220 | 221 | 222 | 223 | 224 |
| 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 |
| 255 | 256 | 257 | 258 | 259 | 260 | 261 | 262 | 263 | 264 | 265 | 266 | 267 | 268 | 269 |
| 270 | 271 | 272 | 273 | 274 | 275 | 276 | 277 | 278 | 279 | 280 | 281 | 282 | 283 | 284 |
| 285 | 286 | 287 | 288 | 289 | 290 | 291 | 292 | 293 | 294 | 295 | 296 | 297 | 298 | 299 |
| 300 | 301 | 302 | 303 | 304 | 305 | 306 | 307 | 308 | 309 | 310 | 311 | 312 | 313 | 314 |
| 315 | 316 | 317 | 318 | 319 | 320 | 321 | 322 | 323 | 324 | 325 | 326 | 327 | 328 | 329 |
| 330 | 331 | 332 | 333 | 334 | 335 | 336 | 337 | 338 | 339 | 340 | 341 | 342 | 343 | 344 |
| 345 | 346 | 347 | 348 | 349 | 350 | 351 | 352 | 353 | 354 | 355 | 356 | 357 | 358 | 359 |
| 360 | 361 | 362 | 363 | 364 | 365 | 366 | 367 | 368 | 369 | 370 | 371 | 372 | 373 | 374 |
| 375 | 376 | 377 | 378 | 379 | 380 | 381 | 382 | 383 | 384 | 385 | 386 | 387 | 388 | 389 |
| 390 | 391 | 392 | 393 | 394 | 395 | 396 | 397 | 398 | 399 | 400 | 401 | 402 | 403 | 404 |
| 405 | 406 | 407 | 408 | 409 | 410 | 411 | 412 | 413 | 414 | 415 | 416 | 417 | 418 | 419 |
| 420 | 421 | 422 | 423 | 424 | 425 | 426 | 427 | 428 | 429 | 430 | 431 | 432 | 433 | 434 |
| 435 | 436 | 437 | 438 | 439 | 440 | 441 | 442 | 443 | 444 | 445 | 446 | 447 | 448 | 449 |
| 450 | 451 | 452 | 453 | 454 | 455 | 456 | 457 | 458 | 459 | 460 | 461 | 462 | 463 | 464 |

Fig. 2a

| 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 15 | 16 | 17 | 18 | 19 | 20 | 21 | 22 | 23 | 24 | 25 | 26 | 27 | 28 | 29 |
| 30 | 31 | 32 | 33 | 34 | 35 | 36 | 37 | 38 | 39 | 40 | 41 | 42 | 43 | 44 |
| 45 | 46 | 47 | 48 | 49 | 50 | 51 | 52 | 53 | 54 | 55 | 56 | 57 | 58 | 59 |
| 60 | 61 | 62 | 63 | 64 | 65 | 66 | 67 | 68 | 69 | 70 | 71 | 72 | 73 | 74 |
| 75 | 76 | 77 | 78 | 79 | 80 | 81 | 82 | 83 | 84 | 85 | 86 | 87 | 88 | 89 |
| 90 | 91 | 92 | 93 | 94 | 95 | 96 | 97 | 98 | 99 | 100 | 101 | 102 | 103 | 104 |
| 105 | 106 | 107 | 108 | 109 | 110 | 111 | 112 | 113 | 114 | 115 | 116 | 117 | 118 | 119 |
| 120 | 121 | 122 | 123 | 124 | 125 | 126 | 127 | 128 | 129 | 130 | 131 | 132 | 133 | 134 |
| 135 | 136 | 137 | 138 | 139 | 140 | 141 | 142 | 143 | 144 | 145 | 146 | 147 | 148 | 149 |
| 150 | 151 | 152 | 153 | 154 | 155 | 156 | 157 | 158 | 159 | 160 | 161 | 162 | 163 | 164 |
| 165 | 166 | 167 | 168 | 169 | 170 | 171 | 172 | 173 | 174 | 175 | 176 | 177 | 178 | 179 |
| 180 | 181 | 182 | 183 | 184 | 185 | 186 | 187 | 188 | 189 | 190 | 191 | 192 | 193 | 194 |
| 195 | 196 | 197 | 198 | 199 | 200 | 201 | 202 | 203 | 204 | 205 | 206 | 207 | 208 | 209 |
| 210 | 211 | 212 | 213 | 214 | 215 | 216 | 217 | 218 | 219 | 220 | 221 | 222 | 223 | 224 |
| 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 |
| 255 | 256 | 257 | 258 | 259 | 260 | 261 | 262 | 263 | 264 | 265 | 266 | 267 | 268 | 269 |
| 270 | 271 | 272 | 273 | 274 | 275 | 276 | 277 | 278 | 279 | 280 | 281 | 282 | 283 | 284 |
| 285 | 286 | 287 | 288 | 289 | 290 | 291 | 292 | 293 | 294 | 295 | 296 | 297 | 298 | 299 |
| 300 | 301 | 302 | 303 | 304 | 305 | 306 | 307 | 308 | 309 | 310 | 311 | 312 | 313 | 314 |
| 315 | 316 | 317 | 318 | 319 | 320 | 321 | 322 | 323 | 324 | 325 | 326 | 327 | 328 | 329 |
| 330 | 331 | 332 | 333 | 334 | 335 | 336 | 337 | 338 | 339 | 340 | 341 | 342 | 343 | 344 |
| 345 | 346 | 347 | 348 | 349 | 350 | 351 | 352 | 353 | 354 | 355 | 356 | 357 | 358 | 359 |
| 360 | 361 | 362 | 363 | 364 | 365 | 366 | 367 | 368 | 369 | 370 | 371 | 372 | 373 | 374 |
| 375 | 376 | 377 | 378 | 379 | 380 | 381 | 382 | 383 | 384 | 385 | 386 | 387 | 388 | 389 |
| 390 | 391 | 392 | 393 | 394 | 395 | 396 | 397 | 398 | 399 | 400 | 401 | 402 | 403 | 404 |
| 405 | 406 | 407 | 408 | 409 | 410 | 411 | 412 | 413 | 414 | 415 | 416 | 417 | 418 | 419 |
| 420 | 421 | 422 | 423 | 424 | 425 | 426 | 427 | 428 | 429 | 430 | 431 | 432 | 433 | 434 |
| 435 | 436 | 437 | 438 | 439 | 440 | 441 | 442 | 443 | 444 | 445 | 446 | 447 | 448 | 449 |
| 450 | 451 | 452 | 453 | 454 | 455 | 456 | 457 | 458 | 459 | 460 | 461 | 462 | 463 | 464 |

Fig. 2b

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 15 | 15 | 15 | 15 | 15 | 15 | 15 | 15 | 15 | 15 | 15 | 15 | 15 | 15 | 15 |
| 30 | 31 | 32 | 33 | 34 | 35 | 36 | 37 | 38 | 39 | 40 | 41 | 42 | 43 | 44 |
| 45 | 46 | 47 | 48 | 49 | 50 | 51 | 52 | 53 | 54 | 55 | 56 | 57 | 58 | 59 |
| 60 | 61 | 62 | 63 | 63 | 63 | 63 | 63 | 63 | 63 | 63 | 63 | 72 | 73 | 74 |
| 75 | 76 | 77 | 78 | 78 | 78 | 78 | 78 | 78 | 78 | 78 | 78 | 87 | 88 | 89 |
| 90 | 91 | 92 | 93 | 94 | 95 | 96 | 97 | 98 | 99 | 100 | 101 | 102 | 103 | 104 |
| 105 | 106 | 107 | 108 | 109 | 110 | 111 | 112 | 113 | 114 | 115 | 116 | 117 | 118 | 119 |
| 120 | 121 | 122 | 123 | 124 | 125 | 126 | 126 | 126 | 129 | 130 | 131 | 132 | 133 | 134 |
| 135 | 136 | 137 | 138 | 139 | 140 | 141 | 141 | 141 | 144 | 145 | 146 | 147 | 148 | 149 |
| 150 | 151 | 152 | 153 | 154 | 155 | 156 | 157 | 158 | 159 | 160 | 161 | 162 | 163 | 164 |
| 165 | 166 | 167 | 168 | 169 | 170 | 171 | 172 | 173 | 174 | 175 | 176 | 177 | 178 | 179 |
| 180 | 181 | 182 | 183 | 184 | 185 | 186 | 187 | 188 | 188 | 188 | 188 | 192 | 193 | 194 |
| 195 | 196 | 197 | 198 | 199 | 200 | 201 | 202 | 203 | 203 | 203 | 203 | 207 | 208 | 209 |
| 210 | 211 | 212 | 213 | 214 | 215 | 216 | 217 | 218 | 218 | 218 | 218 | 222 | 223 | 224 |
| 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 |
| 255 | 256 | 257 | 258 | 259 | 260 | 261 | 262 | 263 | 264 | 265 | 266 | 267 | 268 | 269 |
| 270 | 271 | 272 | 273 | 274 | 275 | 276 | 277 | 278 | 279 | 280 | 281 | 282 | 283 | 284 |
| 285 | 286 | 287 | 288 | 288 | 288 | 288 | 288 | 288 | 288 | 288 | 288 | 297 | 298 | 299 |
| 300 | 301 | 302 | 303 | 304 | 305 | 306 | 307 | 308 | 309 | 310 | 310 | 312 | 313 | 314 |
| 315 | 316 | 317 | 318 | 319 | 320 | 321 | 322 | 323 | 324 | 325 | 325 | 327 | 328 | 329 |
| 330 | 330 | 330 | 330 | 330 | 330 | 330 | 330 | 338 | 339 | 340 | 340 | 342 | 343 | 344 |
| 345 | 345 | 345 | 345 | 345 | 345 | 345 | 345 | 353 | 354 | 355 | 355 | 357 | 358 | 359 |
| 360 | 361 | 362 | 363 | 364 | 365 | 366 | 367 | 368 | 369 | 370 | 370 | 372 | 373 | 374 |
| 375 | 376 | 377 | 378 | 379 | 380 | 381 | 382 | 383 | 384 | 385 | 385 | 387 | 388 | 389 |
| 390 | 391 | 392 | 393 | 393 | 393 | 393 | 393 | 393 | 393 | 393 | 393 | 402 | 403 | 404 |
| 405 | 406 | 407 | 408 | 409 | 410 | 411 | 412 | 413 | 414 | 415 | 416 | 417 | 418 | 419 |
| 420 | 421 | 422 | 423 | 424 | 425 | 426 | 427 | 428 | 429 | 430 | 431 | 432 | 433 | 434 |
| 435 | 435 | 435 | 435 | 435 | 435 | 435 | 435 | 435 | 435 | 435 | 435 | 435 | 435 | 435 |
| 450 | 450 | 450 | 450 | 450 | 450 | 450 | 450 | 450 | 450 | 450 | 450 | 450 | 450 | 450 |

Fig. 3a

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 15 | 15 | 15 | 15 | 15 | 15 | 15 | 15 | 15 | 15 | 15 | 15 | 15 | 15 | 15 |
| 30 | 31 | 32 | 33 | 34 | 35 | 36 | 37 | 38 | 39 | 40 | 41 | 42 | 43 | 44 |
| 45 | 46 | 47 | 48 | 49 | 50 | 51 | 52 | 53 | 54 | 55 | 56 | 57 | 58 | 59 |
| 60 | 61 | 62 | 63 | 64 | 65 | 66 | 67 | 68 | 69 | 70 | 71 | 72 | 73 | 74 |
| 75 | 76 | 77 | 78 | 79 | 80 | 81 | 82 | 83 | 84 | 85 | 86 | 87 | 88 | 89 |
| 90 | 91 | 92 | 93 | 94 | 95 | 96 | 97 | 98 | 99 | 100 | 101 | 102 | 103 | 104 |
| 105 | 106 | 107 | 108 | 109 | 110 | 111 | 112 | 113 | 114 | 115 | 116 | 117 | 118 | 119 |
| 120 | 121 | 122 | 123 | 124 | 125 | 126 | 126 | 126 | 129 | 130 | 131 | 132 | 133 | 134 |
| 135 | 136 | 137 | 138 | 139 | 140 | 141 | 141 | 141 | 144 | 145 | 146 | 147 | 148 | 149 |
| 150 | 151 | 152 | 153 | 154 | 155 | 156 | 157 | 158 | 159 | 160 | 161 | 162 | 163 | 164 |
| 165 | 166 | 167 | 168 | 169 | 170 | 171 | 172 | 173 | 174 | 175 | 176 | 177 | 178 | 179 |
| 180 | 181 | 182 | 183 | 184 | 185 | 186 | 187 | 188 | 188 | 188 | 188 | 192 | 193 | 194 |
| 195 | 196 | 197 | 198 | 199 | 200 | 201 | 202 | 203 | 203 | 203 | 203 | 207 | 208 | 209 |
| 210 | 211 | 212 | 213 | 214 | 215 | 216 | 217 | 218 | 218 | 218 | 218 | 222 | 223 | 224 |
| 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 |
| 255 | 256 | 257 | 258 | 259 | 260 | 261 | 262 | 263 | 264 | 265 | 266 | 267 | 268 | 269 |
| 270 | 271 | 272 | 273 | 274 | 275 | 276 | 277 | 278 | 279 | 280 | 281 | 282 | 283 | 284 |
| 285 | 286 | 287 | 288 | 288 | 288 | 288 | 288 | 288 | 288 | 288 | 288 | 297 | 298 | 299 |
| 300 | 301 | 302 | 303 | 304 | 305 | 306 | 307 | 308 | 309 | 310 | 310 | 312 | 313 | 314 |
| 315 | 316 | 317 | 318 | 319 | 320 | 321 | 322 | 323 | 324 | 325 | 325 | 327 | 328 | 329 |
| 330 | 330 | 330 | 330 | 330 | 330 | 330 | 330 | 338 | 339 | 340 | 340 | 342 | 343 | 344 |
| 345 | 345 | 345 | 345 | 345 | 345 | 345 | 345 | 353 | 354 | 355 | 355 | 357 | 358 | 359 |
| 360 | 361 | 362 | 363 | 364 | 365 | 366 | 367 | 368 | 369 | 370 | 370 | 372 | 373 | 374 |
| 375 | 376 | 377 | 378 | 379 | 380 | 381 | 382 | 383 | 384 | 385 | 385 | 387 | 388 | 389 |
| 390 | 391 | 392 | 393 | 393 | 393 | 393 | 393 | 393 | 393 | 393 | 393 | 402 | 403 | 404 |
| 405 | 406 | 407 | 408 | 409 | 410 | 411 | 412 | 413 | 414 | 415 | 416 | 417 | 418 | 419 |
| 420 | 421 | 422 | 423 | 424 | 425 | 426 | 427 | 428 | 429 | 430 | 431 | 432 | 433 | 434 |
| 435 | 435 | 435 | 435 | 435 | 435 | 435 | 435 | 435 | 435 | 435 | 435 | 435 | 435 | 435 |
| 450 | 450 | 450 | 450 | 450 | 450 | 450 | 450 | 450 | 450 | 450 | 450 | 450 | 450 | 450 |

Fig. 3b

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 31 | 32 | 33 | 34 | 35 | 36 | 37 | 38 | 39 | 40 | 41 | 42 | 43 | 0 |
| 0 | 46 | 47 | 48 | 49 | 50 | 51 | 52 | 53 | 54 | 55 | 56 | 57 | 58 | 0 |
| 0 | 61 | 62 | 63 | 63 | 63 | 63 | 63 | 63 | 63 | 63 | 63 | 72 | 73 | 0 |
| 0 | 76 | 77 | 63 | 63 | 63 | 63 | 63 | 63 | 63 | 63 | 63 | 87 | 88 | 0 |
| 0 | 91 | 92 | 63 | 94 | 95 | 96 | 97 | 98 | 99 | 100 | 63 | 102 | 103 | 0 |
| 0 | 106 | 107 | 63 | 109 | 110 | 111 | 112 | 113 | 114 | 115 | 63 | 117 | 118 | 0 |
| 0 | 121 | 122 | 63 | 124 | 125 | 126 | 126 | 126 | 129 | 130 | 63 | 132 | 133 | 0 |
| 0 | 136 | 137 | 63 | 139 | 140 | 126 | 126 | 126 | 144 | 145 | 63 | 147 | 148 | 0 |
| 0 | 151 | 152 | 63 | 154 | 155 | 156 | 157 | 158 | 159 | 160 | 63 | 162 | 163 | 0 |
| 0 | 166 | 167 | 63 | 169 | 170 | 171 | 172 | 173 | 174 | 175 | 63 | 177 | 178 | 0 |
| 0 | 181 | 182 | 63 | 184 | 185 | 186 | 187 | 188 | 188 | 188 | 63 | 192 | 193 | 0 |
| 0 | 196 | 197 | 63 | 199 | 200 | 201 | 202 | 188 | 188 | 188 | 63 | 207 | 208 | 0 |
| 0 | 211 | 212 | 63 | 214 | 215 | 216 | 217 | 188 | 188 | 188 | 63 | 222 | 223 | 0 |
| 0 | 226 | 227 | 63 | 229 | 230 | 231 | 232 | 233 | 234 | 235 | 236 | 237 | 238 | 0 |
| 0 | 241 | 242 | 63 | 244 | 245 | 246 | 247 | 248 | 249 | 250 | 251 | 252 | 253 | 0 |
| 0 | 256 | 257 | 63 | 259 | 260 | 261 | 262 | 263 | 264 | 265 | 266 | 267 | 268 | 0 |
| 0 | 271 | 272 | 63 | 274 | 275 | 276 | 277 | 278 | 279 | 280 | 281 | 282 | 283 | 0 |
| 0 | 286 | 287 | 63 | 288 | 288 | 288 | 288 | 288 | 288 | 288 | 288 | 297 | 298 | 0 |
| 0 | 301 | 302 | 303 | 304 | 305 | 306 | 307 | 308 | 309 | 288 | 288 | 312 | 313 | 0 |
| 0 | 316 | 317 | 318 | 319 | 320 | 321 | 322 | 323 | 324 | 288 | 288 | 327 | 328 | 0 |
| 0 | 330 | 330 | 330 | 330 | 330 | 330 | 330 | 338 | 339 | 288 | 288 | 342 | 343 | 0 |
| 0 | 330 | 330 | 330 | 330 | 330 | 330 | 330 | 353 | 354 | 288 | 288 | 357 | 358 | 0 |
| 0 | 361 | 362 | 363 | 364 | 365 | 366 | 367 | 368 | 369 | 288 | 288 | 372 | 373 | 0 |
| 0 | 376 | 377 | 378 | 379 | 380 | 381 | 382 | 383 | 384 | 288 | 288 | 387 | 388 | 0 |
| 0 | 391 | 392 | 393 | 393 | 393 | 393 | 393 | 393 | 393 | 288 | 288 | 402 | 403 | 0 |
| 0 | 406 | 407 | 408 | 409 | 410 | 411 | 412 | 413 | 414 | 415 | 416 | 417 | 418 | 0 |
| 0 | 421 | 422 | 423 | 424 | 425 | 426 | 427 | 428 | 429 | 430 | 431 | 432 | 433 | 0 |
| 0 | 435 | 435 | 435 | 435 | 435 | 435 | 435 | 435 | 435 | 435 | 435 | 435 | 435 | 0 |
| 0 | 435 | 435 | 435 | 435 | 435 | 435 | 435 | 435 | 435 | 435 | 435 | 435 | 435 | 0 |

Fig. 4a

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 31 | 32 | 33 | 34 | 35 | 36 | 37 | 38 | 39 | 40 | 41 | 42 | 43 | 0 |
| 0 | 46 | 47 | 48 | 49 | 50 | 51 | 52 | 53 | 54 | 55 | 56 | 57 | 58 | 0 |
| 0 | 61 | 62 | 63 | 63 | 63 | 63 | 63 | 63 | 63 | 63 | 63 | 72 | 73 | 0 |
| 0 | 76 | 77 | 63 | 63 | 63 | 63 | 63 | 63 | 63 | 63 | 63 | 87 | 88 | 0 |
| 0 | 91 | 92 | 63 | 94 | 95 | 96 | 97 | 98 | 99 | 100 | 63 | 102 | 103 | 0 |
| 0 | 106 | 107 | 63 | 109 | 110 | 111 | 112 | 113 | 114 | 115 | 63 | 117 | 118 | 0 |
| 0 | 121 | 122 | 63 | 124 | 125 | 126 | 126 | 126 | 129 | 130 | 63 | 132 | 133 | 0 |
| 0 | 136 | 137 | 63 | 139 | 140 | 126 | 126 | 126 | 144 | 145 | 63 | 147 | 148 | 0 |
| 0 | 151 | 152 | 63 | 154 | 155 | 156 | 157 | 158 | 159 | 160 | 63 | 162 | 163 | 0 |
| 0 | 166 | 167 | 63 | 169 | 170 | 171 | 172 | 173 | 174 | 175 | 63 | 177 | 178 | 0 |
| 0 | 181 | 182 | 63 | 184 | 185 | 186 | 187 | 188 | 188 | 188 | 63 | 192 | 193 | 0 |
| 0 | 196 | 197 | 63 | 199 | 200 | 201 | 202 | 188 | 188 | 188 | 63 | 207 | 208 | 0 |
| 0 | 211 | 212 | 63 | 214 | 215 | 216 | 217 | 188 | 188 | 188 | 63 | 222 | 223 | 0 |
| 0 | 226 | 227 | 63 | 229 | 230 | 231 | 232 | 233 | 234 | 235 | 236 | 237 | 238 | 0 |
| 0 | 241 | 242 | 63 | 244 | 245 | 246 | 247 | 248 | 249 | 250 | 251 | 252 | 253 | 0 |
| 0 | 256 | 257 | 63 | 259 | 260 | 261 | 262 | 263 | 264 | 265 | 266 | 267 | 268 | 0 |
| 0 | 271 | 272 | 63 | 274 | 275 | 276 | 277 | 278 | 279 | 280 | 281 | 282 | 283 | 0 |
| 0 | 286 | 287 | 63 | 288 | 288 | 288 | 288 | 288 | 288 | 288 | 288 | 297 | 298 | 0 |
| 0 | 301 | 302 | 303 | 304 | 305 | 306 | 307 | 308 | 309 | 288 | 288 | 312 | 313 | 0 |
| 0 | 316 | 317 | 318 | 319 | 320 | 321 | 322 | 323 | 324 | 288 | 288 | 327 | 328 | 0 |
| 0 | 330 | 330 | 330 | 330 | 330 | 330 | 330 | 338 | 339 | 288 | 288 | 342 | 343 | 0 |
| 0 | 330 | 330 | 330 | 330 | 330 | 330 | 330 | 353 | 354 | 288 | 288 | 357 | 358 | 0 |
| 0 | 361 | 362 | 363 | 364 | 365 | 366 | 367 | 368 | 369 | 288 | 288 | 372 | 373 | 0 |
| 0 | 376 | 377 | 378 | 379 | 380 | 381 | 382 | 383 | 384 | 288 | 288 | 387 | 388 | 0 |
| 0 | 391 | 392 | 393 | 393 | 393 | 393 | 393 | 393 | 393 | 288 | 288 | 402 | 403 | 0 |
| 0 | 406 | 407 | 408 | 409 | 410 | 411 | 412 | 413 | 414 | 415 | 416 | 417 | 418 | 0 |
| 0 | 421 | 422 | 423 | 424 | 425 | 426 | 427 | 428 | 429 | 430 | 431 | 432 | 433 | 0 |
| 0 | 435 | 435 | 435 | 435 | 435 | 435 | 435 | 435 | 435 | 435 | 435 | 435 | 435 | 0 |
| 0 | 435 | 435 | 435 | 435 | 435 | 435 | 435 | 435 | 435 | 435 | 435 | 435 | 435 | 0 |

Fig. 4b

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 31 | 32 | 33 | 34 | 35 | 36 | 37 | 38 | 39 | 40 | 41 | 42 | 43 | 0 |
| 0 | 46 | 47 | 48 | 49 | 50 | 51 | 52 | 53 | 54 | 55 | 56 | 57 | 58 | 0 |
| 0 | 61 | 62 | 63 | 63 | 63 | 63 | 63 | 63 | 63 | 63 | 63 | 72 | 73 | 0 |
| 0 | 76 | 77 | 63 | 63 | 63 | 63 | 63 | 63 | 63 | 63 | 63 | 87 | 88 | 0 |
| 0 | 91 | 92 | 63 | 94 | 95 | 96 | 97 | 98 | 99 | 100 | 63 | 102 | 103 | 0 |
| 0 | 106 | 107 | 63 | 109 | 110 | 111 | 112 | 113 | 114 | 115 | 63 | 117 | 118 | 0 |
| 0 | 121 | 122 | 63 | 124 | 125 | 126 | 126 | 126 | 129 | 130 | 63 | 132 | 133 | 0 |
| 0 | 136 | 137 | 63 | 139 | 140 | 126 | 126 | 126 | 144 | 145 | 63 | 147 | 148 | 0 |
| 0 | 151 | 152 | 63 | 154 | 155 | 156 | 157 | 158 | 159 | 160 | 63 | 162 | 163 | 0 |
| 0 | 166 | 167 | 63 | 169 | 170 | 171 | 172 | 173 | 174 | 175 | 63 | 177 | 178 | 0 |
| 0 | 181 | 182 | 63 | 184 | 185 | 186 | 187 | 188 | 188 | 188 | 63 | 192 | 193 | 0 |
| 0 | 196 | 197 | 63 | 199 | 200 | 201 | 202 | 188 | 188 | 188 | 63 | 207 | 208 | 0 |
| 0 | 211 | 212 | 63 | 214 | 215 | 216 | 217 | 188 | 188 | 188 | 63 | 222 | 223 | 0 |
| 0 | 226 | 227 | 63 | 229 | 230 | 231 | 232 | 233 | 234 | 235 | 236 | 237 | 238 | 0 |
| 0 | 241 | 242 | 63 | 244 | 245 | 246 | 247 | 248 | 249 | 250 | 251 | 252 | 253 | 0 |
| 0 | 256 | 257 | 63 | 259 | 260 | 261 | 262 | 263 | 264 | 265 | 266 | 267 | 268 | 0 |
| 0 | 271 | 272 | 63 | 274 | 275 | 276 | 277 | 278 | 279 | 280 | 281 | 282 | 283 | 0 |
| 0 | 286 | 287 | 63 | 63 | 63 | 63 | 63 | 63 | 63 | 63 | 63 | 297 | 298 | 0 |
| 0 | 301 | 302 | 303 | 304 | 305 | 306 | 307 | 308 | 309 | 288 | 288 | 312 | 313 | 0 |
| 0 | 316 | 317 | 318 | 319 | 320 | 321 | 322 | 323 | 324 | 288 | 288 | 327 | 328 | 0 |
| 0 | 0 | 0 | 0 | 0 | 0 | 0 | 0 | 338 | 339 | 288 | 288 | 342 | 343 | 0 |
| 0 | 0 | 0 | 0 | 0 | 0 | 0 | 0 | 353 | 354 | 288 | 288 | 357 | 358 | 0 |
| 0 | 361 | 362 | 363 | 364 | 365 | 366 | 367 | 368 | 369 | 288 | 288 | 372 | 373 | 0 |
| 0 | 376 | 377 | 378 | 379 | 380 | 381 | 382 | 383 | 384 | 288 | 288 | 387 | 388 | 0 |
| 0 | 391 | 392 | 393 | 393 | 393 | 393 | 393 | 393 | 393 | 288 | 288 | 402 | 403 | 0 |
| 0 | 406 | 407 | 408 | 409 | 410 | 411 | 412 | 413 | 414 | 415 | 416 | 417 | 418 | 0 |
| 0 | 421 | 422 | 423 | 424 | 425 | 426 | 427 | 428 | 429 | 430 | 431 | 432 | 433 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

Fig. 5a

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 31 | 32 | 33 | 34 | 35 | 36 | 37 | 38 | 39 | 40 | 41 | 42 | 43 | 0 |
| 0 | 46 | 47 | 48 | 49 | 50 | 51 | 52 | 53 | 54 | 55 | 56 | 57 | 58 | 0 |
| 0 | 61 | 62 | 63 | 63 | 63 | 63 | 63 | 63 | 63 | 63 | 63 | 72 | 73 | 0 |
| 0 | 76 | 77 | 63 | 63 | 63 | 63 | 63 | 63 | 63 | 63 | 63 | 87 | 88 | 0 |
| 0 | 91 | 92 | 63 | 94 | 95 | 96 | 97 | 98 | 99 | 100 | 63 | 102 | 103 | 0 |
| 0 | 106 | 107 | 63 | 109 | 110 | 111 | 112 | 113 | 114 | 115 | 63 | 117 | 118 | 0 |
| 0 | 121 | 122 | 63 | 124 | 125 | 126 | 126 | 126 | 129 | 130 | 63 | 132 | 133 | 0 |
| 0 | 136 | 137 | 63 | 139 | 140 | 126 | 126 | 126 | 144 | 145 | 63 | 147 | 148 | 0 |
| 0 | 151 | 152 | 63 | 154 | 155 | 156 | 157 | 158 | 159 | 160 | 63 | 162 | 163 | 0 |
| 0 | 166 | 167 | 63 | 169 | 170 | 171 | 172 | 173 | 174 | 175 | 63 | 177 | 178 | 0 |
| 0 | 181 | 182 | 63 | 184 | 185 | 186 | 187 | 63 | 63 | 63 | 63 | 192 | 193 | 0 |
| 0 | 196 | 197 | 63 | 199 | 200 | 201 | 202 | 63 | 63 | 63 | 63 | 207 | 208 | 0 |
| 0 | 211 | 212 | 63 | 214 | 215 | 216 | 217 | 63 | 63 | 63 | 63 | 222 | 223 | 0 |
| 0 | 226 | 227 | 63 | 229 | 230 | 231 | 232 | 233 | 234 | 235 | 236 | 237 | 238 | 0 |
| 0 | 241 | 242 | 63 | 244 | 245 | 246 | 247 | 248 | 249 | 250 | 251 | 252 | 253 | 0 |
| 0 | 256 | 257 | 63 | 259 | 260 | 261 | 262 | 263 | 264 | 265 | 266 | 267 | 268 | 0 |
| 0 | 271 | 272 | 63 | 274 | 275 | 276 | 277 | 278 | 279 | 280 | 281 | 282 | 283 | 0 |
| 0 | 286 | 287 | 63 | 63 | 63 | 63 | 63 | 63 | 63 | 63 | 63 | 297 | 298 | 0 |
| 0 | 301 | 302 | 303 | 304 | 305 | 306 | 307 | 308 | 309 | 288 | 288 | 312 | 313 | 0 |
| 0 | 316 | 317 | 318 | 319 | 320 | 321 | 322 | 323 | 324 | 288 | 288 | 327 | 328 | 0 |
| 0 | 0 | 0 | 0 | 0 | 0 | 0 | 0 | 338 | 339 | 288 | 288 | 342 | 343 | 0 |
| 0 | 0 | 0 | 0 | 0 | 0 | 0 | 0 | 353 | 354 | 288 | 288 | 357 | 358 | 0 |
| 0 | 361 | 362 | 363 | 364 | 365 | 366 | 367 | 368 | 369 | 288 | 288 | 372 | 373 | 0 |
| 0 | 376 | 377 | 378 | 379 | 380 | 381 | 382 | 383 | 384 | 288 | 288 | 387 | 388 | 0 |
| 0 | 391 | 392 | 393 | 393 | 393 | 393 | 393 | 393 | 393 | 288 | 288 | 402 | 403 | 0 |
| 0 | 406 | 407 | 408 | 409 | 410 | 411 | 412 | 413 | 414 | 415 | 416 | 417 | 418 | 0 |
| 0 | 421 | 422 | 423 | 424 | 425 | 426 | 427 | 428 | 429 | 430 | 431 | 432 | 433 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

Fig. 5b

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 31 | 32 | 33 | 34 | 35 | 36 | 37 | 38 | 39 | 40 | 41 | 42 | 43 | 0 |
| 0 | 46 | 47 | 48 | 49 | 50 | 51 | 52 | 53 | 54 | 55 | 56 | 57 | 58 | 0 |
| 0 | 61 | 62 | 63 | 63 | 63 | 63 | 63 | 63 | 63 | 63 | 63 | 72 | 73 | 0 |
| 0 | 76 | 77 | 63 | 63 | 63 | 63 | 63 | 63 | 63 | 63 | 63 | 87 | 88 | 0 |
| 0 | 91 | 92 | 63 | 94 | 95 | 96 | 97 | 98 | 99 | 100 | 63 | 102 | 103 | 0 |
| 0 | 106 | 107 | 63 | 109 | 110 | 111 | 112 | 113 | 114 | 115 | 63 | 117 | 118 | 0 |
| 0 | 121 | 122 | 63 | 124 | 125 | 126 | 126 | 126 | 129 | 130 | 63 | 132 | 133 | 0 |
| 0 | 136 | 137 | 63 | 139 | 140 | 126 | 126 | 126 | 144 | 145 | 63 | 147 | 148 | 0 |
| 0 | 151 | 152 | 63 | 154 | 155 | 156 | 157 | 158 | 159 | 160 | 63 | 162 | 163 | 0 |
| 0 | 166 | 167 | 63 | 169 | 170 | 171 | 172 | 173 | 174 | 175 | 63 | 177 | 178 | 0 |
| 0 | 181 | 182 | 63 | 184 | 185 | 186 | 187 | 63 | 63 | 63 | 63 | 192 | 193 | 0 |
| 0 | 196 | 197 | 63 | 199 | 200 | 201 | 202 | 63 | 63 | 63 | 63 | 207 | 208 | 0 |
| 0 | 211 | 212 | 63 | 214 | 215 | 216 | 217 | 63 | 63 | 63 | 63 | 222 | 223 | 0 |
| 0 | 226 | 227 | 63 | 229 | 230 | 231 | 232 | 233 | 234 | 235 | 236 | 237 | 238 | 0 |
| 0 | 241 | 242 | 63 | 244 | 245 | 246 | 247 | 248 | 249 | 250 | 251 | 252 | 253 | 0 |
| 0 | 256 | 257 | 63 | 259 | 260 | 261 | 262 | 263 | 264 | 265 | 266 | 267 | 268 | 0 |
| 0 | 271 | 272 | 63 | 274 | 275 | 276 | 277 | 278 | 279 | 280 | 281 | 282 | 283 | 0 |
| 0 | 286 | 287 | 63 | 63 | 63 | 63 | 63 | 63 | 63 | 63 | 63 | 297 | 298 | 0 |
| 0 | 301 | 302 | 303 | 304 | 305 | 306 | 307 | 308 | 309 | 63 | 63 | 312 | 313 | 0 |
| 0 | 316 | 317 | 318 | 319 | 320 | 321 | 322 | 323 | 324 | 63 | 63 | 327 | 328 | 0 |
| 0 | 0 | 0 | 0 | 0 | 0 | 0 | 0 | 338 | 339 | 63 | 63 | 342 | 343 | 0 |
| 0 | 0 | 0 | 0 | 0 | 0 | 0 | 0 | 353 | 354 | 63 | 63 | 357 | 358 | 0 |
| 0 | 361 | 362 | 363 | 364 | 365 | 366 | 367 | 368 | 369 | 63 | 63 | 372 | 373 | 0 |
| 0 | 376 | 377 | 378 | 379 | 380 | 381 | 382 | 383 | 384 | 63 | 63 | 387 | 388 | 0 |
| 0 | 391 | 392 | 393 | 393 | 393 | 393 | 393 | 393 | 393 | 63 | 63 | 402 | 403 | 0 |
| 0 | 406 | 407 | 408 | 409 | 410 | 411 | 412 | 413 | 414 | 415 | 416 | 417 | 418 | 0 |
| 0 | 421 | 422 | 423 | 424 | 425 | 426 | 427 | 428 | 429 | 430 | 431 | 432 | 433 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

Fig. 6a

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 31 | 32 | 33 | 34 | 35 | 36 | 37 | 38 | 39 | 40 | 41 | 42 | 43 | 0 |
| 0 | 46 | 47 | 48 | 49 | 50 | 51 | 52 | 53 | 54 | 55 | 56 | 57 | 58 | 0 |
| 0 | 61 | 62 | 63 | 63 | 63 | 63 | 63 | 63 | 63 | 63 | 63 | 72 | 73 | 0 |
| 0 | 76 | 77 | 63 | 63 | 63 | 63 | 63 | 63 | 63 | 63 | 63 | 87 | 88 | 0 |
| 0 | 91 | 92 | 63 | 94 | 95 | 96 | 97 | 98 | 99 | 100 | 63 | 102 | 103 | 0 |
| 0 | 106 | 107 | 63 | 109 | 110 | 111 | 112 | 113 | 114 | 115 | 63 | 117 | 118 | 0 |
| 0 | 121 | 122 | 63 | 124 | 125 | 126 | 126 | 126 | 129 | 130 | 63 | 132 | 133 | 0 |
| 0 | 136 | 137 | 63 | 139 | 140 | 126 | 126 | 126 | 144 | 145 | 63 | 147 | 148 | 0 |
| 0 | 151 | 152 | 63 | 154 | 155 | 156 | 157 | 158 | 159 | 160 | 63 | 162 | 163 | 0 |
| 0 | 166 | 167 | 63 | 169 | 170 | 171 | 172 | 173 | 174 | 175 | 63 | 177 | 178 | 0 |
| 0 | 181 | 182 | 63 | 184 | 185 | 186 | 187 | 63 | 63 | 63 | 63 | 192 | 193 | 0 |
| 0 | 196 | 197 | 63 | 199 | 200 | 201 | 202 | 63 | 63 | 63 | 63 | 207 | 208 | 0 |
| 0 | 211 | 212 | 63 | 214 | 215 | 216 | 217 | 63 | 63 | 63 | 63 | 222 | 223 | 0 |
| 0 | 226 | 227 | 63 | 229 | 230 | 231 | 232 | 233 | 234 | 235 | 236 | 237 | 238 | 0 |
| 0 | 241 | 242 | 63 | 244 | 245 | 246 | 247 | 248 | 249 | 250 | 251 | 252 | 253 | 0 |
| 0 | 256 | 257 | 63 | 259 | 260 | 261 | 262 | 263 | 264 | 265 | 266 | 267 | 268 | 0 |
| 0 | 271 | 272 | 63 | 274 | 275 | 276 | 277 | 278 | 279 | 280 | 281 | 282 | 283 | 0 |
| 0 | 286 | 287 | 63 | 63 | 63 | 63 | 63 | 63 | 63 | 63 | 63 | 297 | 298 | 0 |
| 0 | 301 | 302 | 303 | 304 | 305 | 306 | 307 | 308 | 309 | 63 | 63 | 312 | 313 | 0 |
| 0 | 316 | 317 | 318 | 319 | 320 | 321 | 322 | 323 | 324 | 63 | 63 | 327 | 328 | 0 |
| 0 | 0 | 0 | 0 | 0 | 0 | 0 | 0 | 338 | 339 | 63 | 63 | 342 | 343 | 0 |
| 0 | 0 | 0 | 0 | 0 | 0 | 0 | 0 | 353 | 354 | 63 | 63 | 357 | 358 | 0 |
| 0 | 361 | 362 | 363 | 364 | 365 | 366 | 367 | 368 | 369 | 63 | 63 | 372 | 373 | 0 |
| 0 | 376 | 377 | 378 | 379 | 380 | 381 | 382 | 383 | 384 | 63 | 63 | 387 | 388 | 0 |
| 0 | 391 | 392 | 63 | 63 | 63 | 63 | 63 | 63 | 63 | 63 | 63 | 402 | 403 | 0 |
| 0 | 406 | 407 | 408 | 409 | 410 | 411 | 412 | 413 | 414 | 415 | 416 | 417 | 418 | 0 |
| 0 | 421 | 422 | 423 | 424 | 425 | 426 | 427 | 428 | 429 | 430 | 431 | 432 | 433 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

Fig. 6b

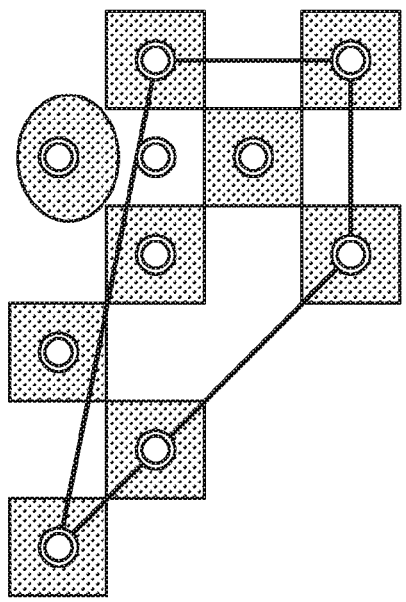
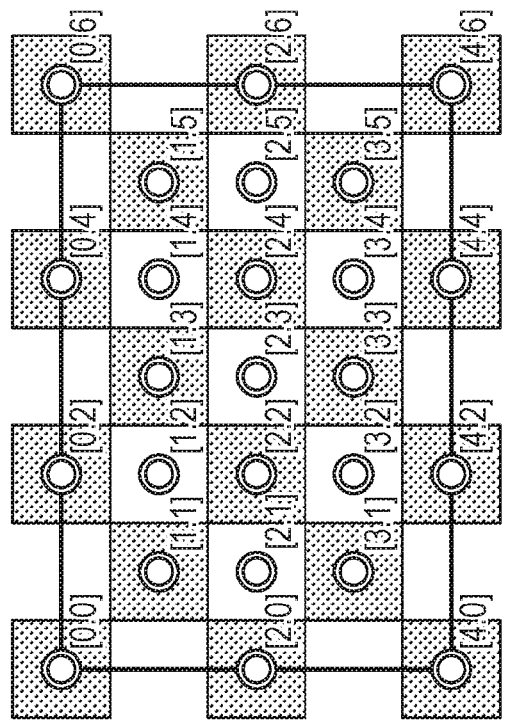
Fig. 8
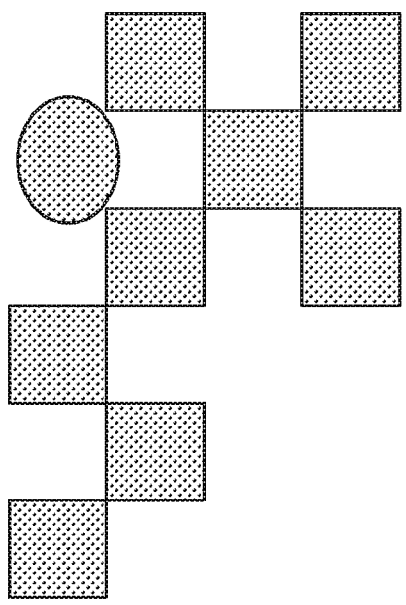
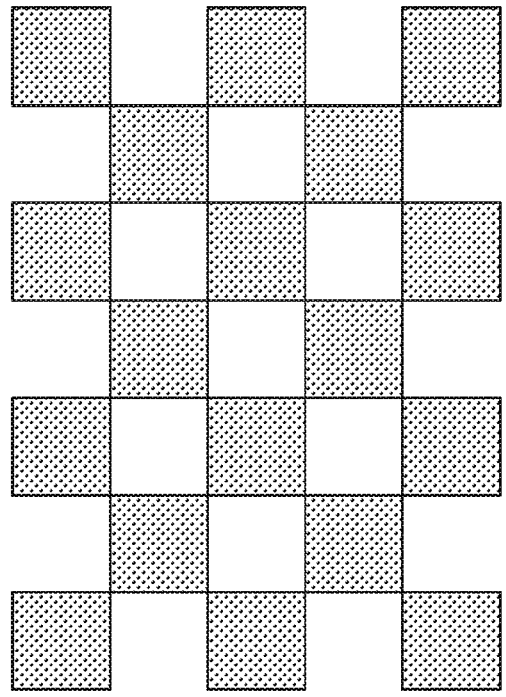

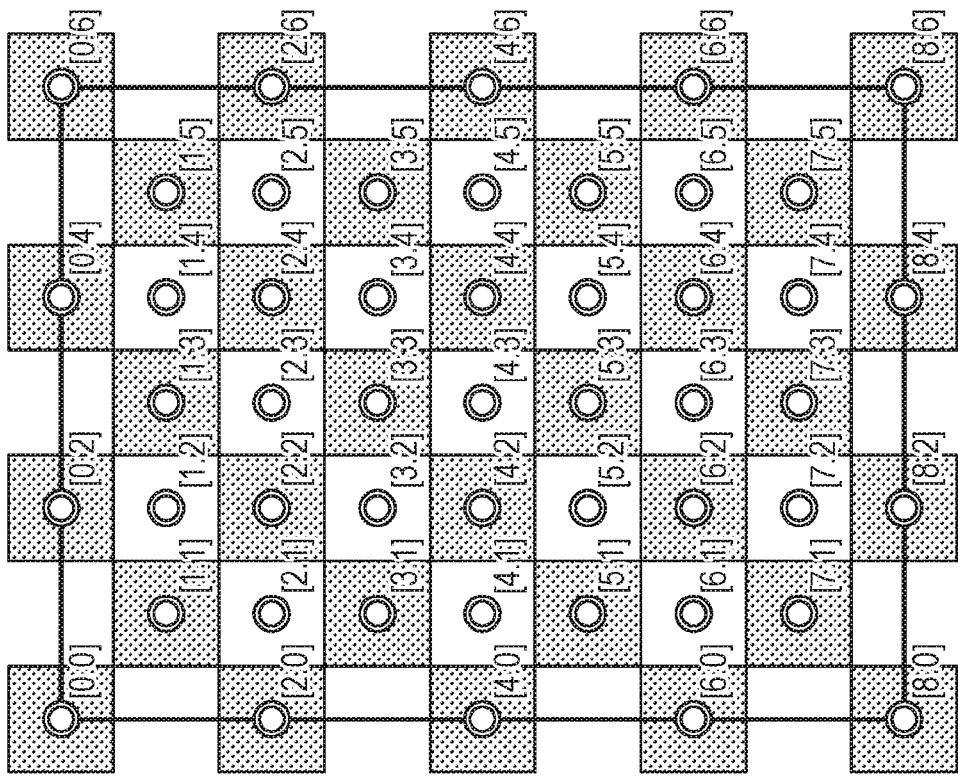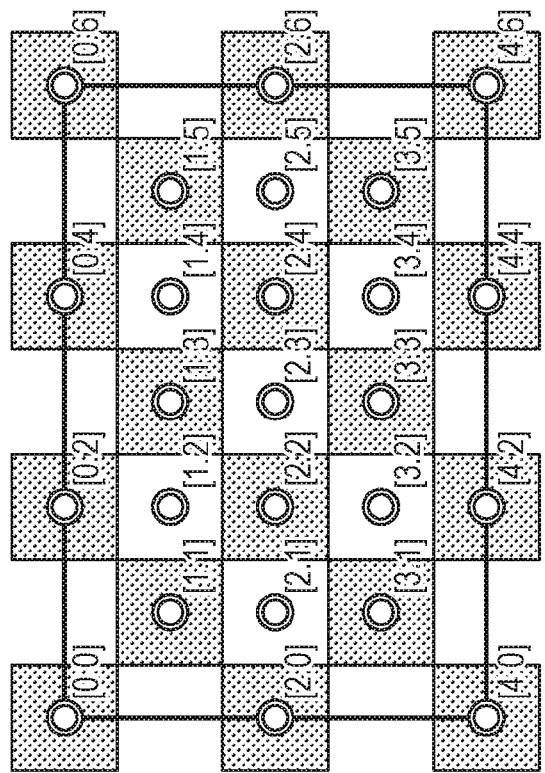
Fig. 9

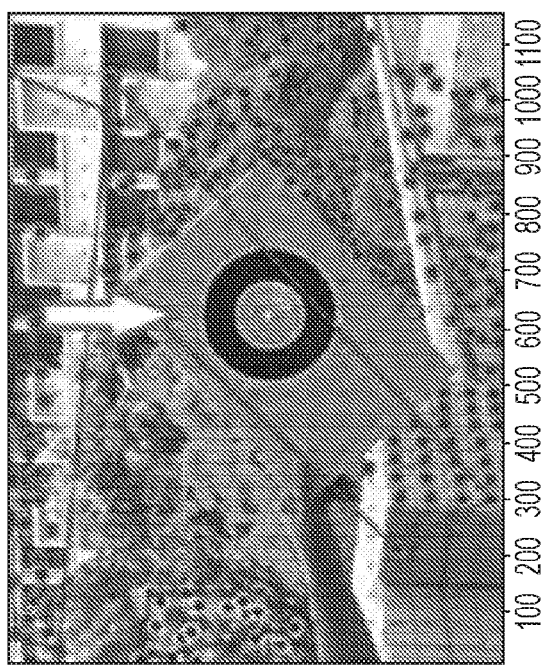
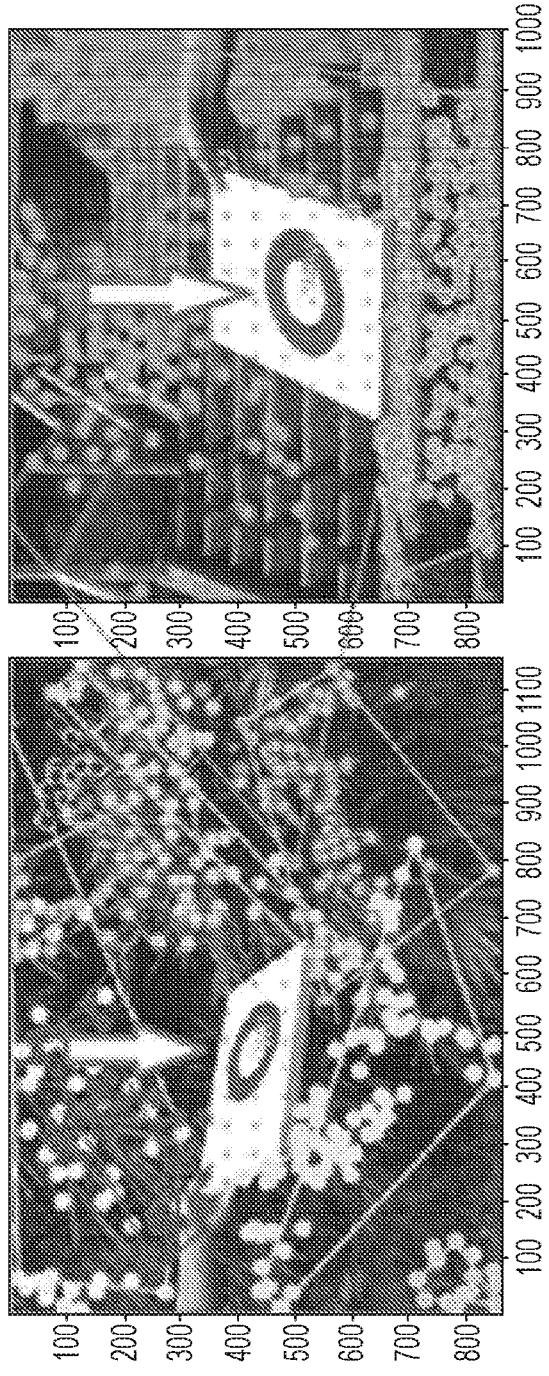
Fig. 13

METHOD FOR OPTICAL RECOGNITION OF MARKERS

FIELD OF THE INVENTION

This application claims the benefit of priority to BR 10 2018 003125-2, filed 19 Feb. 2018, which is incorporated herein by reference in its entirety.

The present disclosure relates to a method for optical recognition of markers. More particularly, the present disclosure relates to a robust method for optical recognition of markers in an outdoor environment.

BACKGROUND OF THE INVENTION

Detection of patterns in an outdoor environment is a challenging task that has been the object of research in many fields, from face recognition to recognition of patterns inserted in environments with varying illumination. However, little attention has been paid to the problem of locating optical markers in external situations, where the illumination and the overall histogram may vary considerably.

Among the possible applications of a robust method for optical recognition of markers in an outdoor environment, we may mention:

(i) identification and localization of components, equipment or other objects in construction sites, shipyards, ships and platforms;

(ii) systems for dynamic positioning of equipment for assembly of modules and platforms;

(iii) applications of virtual reality with immersion in an outdoor environment;

(iv) geolocation and optical reference systems for aircraft, manned or unmanned;

(v) locating, monitoring the movement of and tracking components and equipment in an outdoor environment;

(vi) feedback system for robotized positioning of components.

At present, optical recognition of markers is restricted to indoor environments with controlled illumination, and there are no requirements for robustness in an outdoor environment. These methods are generally associated with the creation of augmented reality, which is very common nowadays.

Document WO2015176163A1, for example, discloses a method for detecting a marker in an image including the steps of: (i) detecting a marker in one or more previous frames of the image; (ii) using an edge detector for detecting an edge in a current frame of said image; (iii) tracking line segment edges of the marker detected in the previous frame to find a new set of line segments; (iv) grouping the new set of line segments to supply a new set of polygons having salient points; (v) calculating homography from polygon salient points; (vi) generating a list of homographies; (vii) extracting binary data from the input image having homographies; (viii) verifying if the image is a marker by performing check sum and error correction functions; and (ix) if the image is a marker, identify as a marker and verify binary data, wherein the image is a consecutive image sequence.

Document U.S. Pat. No. 8,963,957B2 discloses a system and method for augmenting the view of reality. In one embodiment, a first medium is superimposed over a first view of reality. One or more changes to the superimposed medium are received, such as a change in transparency, change in size and change in position. A first marker, comprising at least a portion of the first view of reality, is generated. First metadata relating to the first medium and/or the first marker are also generated. The first medium, the first marker, and the first metadata are sent to a depository. In another embodiment, a second medium, second marker, and second metadata are received from the depository. The second marker is matched to at least a portion of a second view of reality, and the second medium is superimposed over the at least one portion of the second view of reality to generate an augmented view of reality.

Document EP1720131B1 describes an augmented reality method and system comprising: (i) means for gathering image data of a real environment, (ii) means for generating virtual image data from said image data, (iii) means for identifying a predefined marker object of the real environment based on the image data, and (iv) means for superimposing a set of object image data with the virtual image data at a virtual image position corresponding to the predefined marker object.

However, none of the methods described in the aforementioned documents discloses steps that would provide robustness in the identification of markers in an outdoor environment.

In addition, as is known, the technology most used for optical recognition is ARToolKit, which is widely used in the creation of augmented reality. The ARToolKit algorithm comprises the following steps:

1. Image acquisition;
2. Digitization;
3. Identification of connected components;
4. Identification of fine edges;
5. Extraction of vertices and sides;
6. Normalization of the pattern;
7. Comparison with templates;
8. Homography and camera transformation;
9. Inclusion of the virtual object.

However, this technology has serious limitations that mean that it is not very robust for use in an industrial and construction site environment—recognition of the markers fails in situations with uncontrolled illumination or partial occlusion. In particular, steps 3, 4, 5 and 7 listed above are quite sensitive to variations in illumination and partial occlusion, so that this technology is not robust enough for application in outdoor environments.

Other tracking technologies exist, such as radio frequency identification (RFID) and VICON systems that require fixing unique markers on the components, but they require databases and complex data acquisition equipment.

Thus, in the prior art there is a need for a technique for optical recognition of markers in common use that is robust even in situations of uncontrolled illumination or partial occlusion, as normally encountered in outdoor environments.

As will be described in more detail hereunder, the present disclosure aims to solve the problem of the prior art described above in a practical and efficient manner.

SUMMARY OF THE INVENTION

The present disclosure aims to provide a method for optical recognition of markers in an outdoor environment that is robust even in situations of uncontrolled illumination or partial occlusion.

According to the present disclosure, there is provided a method for optical recognition of optical markers comprising one or more of the steps of: acquiring an image; identifying regions of contiguous colours in the image by flood filling; extracting data and parameters of the contiguous regions; and detecting an optical marker by means of a convex hull algorithm and prediction of position of squares based on the data and parameters extracted from the contiguous regions. The method may be particularly suitable for use in an outdoor environment.

Optionally, the optical marker is a target comprising concentric circles or a checkerboard.

Optionally, the step of identifying regions of contiguous colours in the image comprises the following substeps: applying at least one filter to the image; detecting edges in the image so as to separate the different regions of contiguous colours; carrying out the filling of the separated regions using flood filling; and identifying each of the different regions of contiguous colours by their properties.

Optionally, the substep of carrying out filling of the separated regions comprises at least one of the following substeps: receiving an edge map; creating a map of colour regions; initializing the map of colour regions by assigning an index to each pixel, the index being a unique colour number; and performing the following steps, until the map of colour regions remains unchanged: (i) scanning the map of colour regions from left to right, from right to left, from top to bottom and from bottom to top in parallel, in any order; (ii) if the pixel is not located within any edge and its index is greater than that of the preceding pixel, give the present pixel the same index as the preceding pixel.

Optionally, the step of detecting the optical marker comprises at least one of the following substeps: (i) calculating the convex hull of the centres of regions of contiguous colours grouped in the same region; (ii) for each vertex $v_n$ in the convex hull, calculating the angle between the lines formed by $v_n \rightarrow v_{n-1}$ and $v_n \rightarrow v_{n-1}$; (iii) ordering the vertices by the calculated angles; and (iv) keeping the four vertices with the largest angles therebetween and discarding regions whose opposite angles are higher than a threshold.

Optionally, the step of detecting the optical marker further comprises an analysis of regularity of chequerboards, comprising at least one of the following substeps: (i) applying a convex hull algorithm using the 2D centres of the contiguous regions to find four outer squares at the edges of a chequerboard; (ii) calculating and storing the location of fixed squares using the four outer squares as reference; (iii) if the group of regions being analysed possesses sufficient regions, assigning regions to positions on the closest chequerboard having four outer squares; (iv) rejecting the chequerboard if more than one region is assigned to the same position.

Optionally, the four outer squares are of the same colour. Optionally, the four outer squares are black.

According to the present disclosure, there is also provided a method for optical recognition of optical markers comprising the steps of: acquiring an image; identifying regions of contiguous colours in the image by flood filling; extracting data and parameters of the contiguous regions; and detecting an optical marker based on the data and parameters extracted from the contiguous regions by combining the parameters in order to identify an optical marker, the optical marker being a target comprising a plurality of concentric circles.

Optionally, the method further comprises an assigning a letter to each of the contiguous regions to identify the sequence of colours of the plurality of concentric circles.

According to the present disclosure, there is also provided a method for optical recognition of markers in an outdoor environment, characterized in that it comprises at least one of the steps of: a) acquiring an image; b) identifying regions of contiguous colours in the image by parallel filling; c) extracting data and parameters of the contiguous regions; and d) detecting targets and chequerboards by means of a convex wrapping algorithm and prediction of position of squares.

Optionally, step (b) of identifying regions of contiguous colours in the image comprises the following substeps: applying at least one filter to the image; detecting edges so as to separate the different regions of contiguous colours; carrying out the filling of the separated regions using parallel filling; and identifying each of the different regions according to their properties.

Optionally, the substep of carrying out filling of the regions comprises at least one of the following substeps: receiving an edge map; creating a map of colour regions; initializing the map of colour regions by assigning each pixel to a unique colour number, called index; and performing the following steps, until the map of colour regions remains unchanged: (i) scanning the map of regions from left to right, from right to left, from top to bottom and from bottom to top in parallel, in any order; (ii) if the pixel is not located within any edge and its index is greater than that of the preceding pixel, give the present pixel the same index as the preceding pixel.

Optionally, step (d) of detecting targets and chequerboards by means of a convex wrapping algorithm and prediction of position of squares comprises at least one of the following substeps: (i) calculating the convex wrapping of the centres of regions of contiguous colours grouped in the same region; (ii) for each vertex $v_n$ in the convex wrapping, calculating the angle between the lines formed by $v_n \rightarrow v_{n-1}$ and $v_n \rightarrow v_{n-1}$; (iii) ordering the vertex by its angles; and (iv) keeping the first four vertices and discarding regions whose opposite angles are very different from one another.

Optionally, step (d) of detecting targets and chequerboards by means of a convex wrapping algorithm and prediction of position of squares additionally comprises an analysis of regularity of chequerboards, comprising at least one of the following substeps: (i) applying a convex wrapping algorithm using the centre 2D of the contiguous region to find squares at the edges; (ii) calculating and storing the location of fixed squares using the four black outer squares as reference; (iii) if the group of the region being analysed possesses sufficient regions, assigning regions to its position on the closest board; (iv) rejecting the chequerboard if more than one region is assigned to the same position.

In order to achieve the aforestated aim, the present disclosure provides a method for optical recognition of markers in an outdoor environment, comprising the steps of (a) acquiring an image, (b) identifying regions of contiguous colours in the image by flood filling, (c) extracting data and parameters of the contiguous regions and (d) detecting targets and chequerboards by means of a convex hull algorithm and prediction of position of squares.

BRIEF DESCRIPTION OF THE FIGURES

The detailed description presented hereunder refers to the appended figures and their respective reference numbers.

FIG. 1b shows initialization of the colour map with the respective indices with reference to FIG. 1a.

FIG. 2a shows a typical edge map of the Sobel method applied to the present example.

FIG. 2b shows a first scan from left to right applied to the present example.

FIG. 3a shows a first scan from right to left applied to the present example.

FIG. 3b shows a first scan from top to bottom applied to the present example.

FIG. 4a shows a first scan from bottom to top applied to the present example.

FIG. 4b shows a second scan from left to right applied to the present example.

FIG. 5a shows a second scan from right to left applied to the present example.

FIG. 5b shows a second scan from top to bottom applied to the present example.

FIG. 6a shows the final configuration of the map after the second scan from bottom to top, the third scan from left to right and the third scan from right to left in the present example.

FIG. 6b shows the final configuration of the map in the present example with the regions identified with unique colours.

FIG. 8 shows chequerboards compared with irregular patterns.

FIGS. 9 and 10 show chequerboards of different sizes that are identified in different positions and inclinations.

FIGS. 12 and 13 shows examples of patterns of targets (markers) identifiable by the method of the present disclosure.

DETAILED DESCRIPTION OF THE INVENTION

Figure 1A:
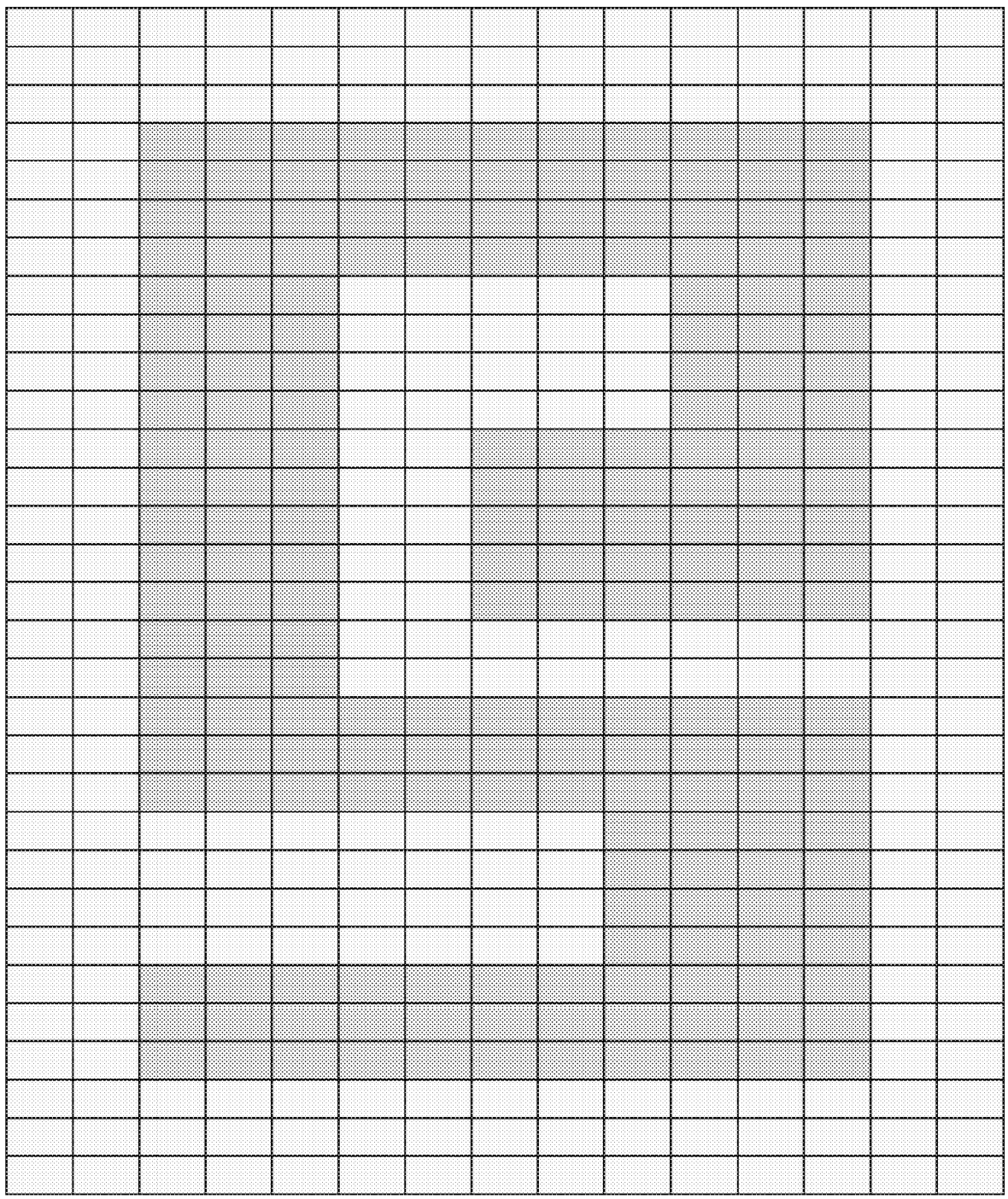
FIG. 1a shows an example image in grey where the method of the present disclosure is applied.

Firstly, it is emphasized that the description given hereunder will be based on a preferred embodiment. As will be obvious to a person skilled in the art, however, the invention is not limited to this particular embodiment.

The present disclosure provides a method for optical recognition of markers. The method may be particularly suitable for recognising markers in an outdoor environment. The first step (a) of the method may be acquiring an image. Preferably, the image comprises optical markers located in the environment where it is desired to perform the recognition. The optical marker may be a target comprising concentric circles, or a checkerboard (i.e. an area made up of alternating coloured squares, such as black and white squares). The image may be acquired by any suitable method, for example by using a camera.

The second part of the method is step (b) of identifying regions of contiguous colours in the image by flood filling (also known as parallel filling). This part of the method is preferably divided into the following steps:
   (i) optionally, applying at least one filter to the image;
   (ii) detecting edges so as to separate the different regions of contiguous colours;
   (iii) carrying out filling of the separated regions using flood filling; and
   (iv) identifying each of the different regions of contiguous colours by their properties.

Preferably, step (ii) may be carried out using multiple edge algorithms, such as the Sobel method, widely known in the prior art. The document "BAGLODI, V. Edge detection comparison study and discussion of new methodology. In: IEEE Southeastcon 2009. [S.I.: s.n.], 2009. P. 446-446. ISSN 1091-0050." describes in detail the use of the Sobel method, and its contents are incorporated here by reference.

Preferably, step (iii) of performing filling of the separated regions using flood filling comprises the following substeps:
   (iii-a) receiving an edge map;
   (iii-b) creating a map of colour regions;
   (iii-c) initializing the map of colour regions by assigning each pixel to a unique index number, the index representing a colour; and
   (iii-d) performing the following steps until the map of colour regions remains unchanged:
   (iii-d-1) scanning the map of regions from left to right, from right to left, from top to bottom and from bottom to top, in parallel and in any order;
   (iii-d-1) if the pixel is not located within any edge and its index is greater than that of the preceding pixel, giving the present pixel the same index as the preceding pixel.

FIGS. 1 to 6 illustrate the proposed algorithm for identifying regions of contiguous colours using an image created for this purpose. In particular, FIGS. 1a and 1b show, respectively, the example image in grey and initialization of the colour map with the respective indices. FIGS. 2a and 2b show, respectively, a typical edge map of the Sobel method and a first scan from left to right. In each row, when scanning from left to right, pixels which are not located within the edge and have a number greater than the previous pixel are given the same number as the previous pixel. For example, pixels 1-14 from FIG. 2a are given the number "O" in FIG. 2b. On the other hand, pixels 31-49 are not renumbered because they are part of the edge region. FIGS. 3a and 3b show, respectively, a first scan from right to left (in which there are no changes from FIG. 2b) and a first scan from top to bottom. FIGS. 4a and 4b show, respectively, a first scan from bottom to top (in which there are no changes from FIG. 3b) and a second scan from left to right. FIGS. 5a and 5b show, respectively, a second scan from right to left and a second scan from top to bottom. FIG. 6a shows the final configuration of the map afterthe second scan from bottom to top (no changes), the third scan from left to right (no changes) and the third scan from right to left.

Figure 6B:
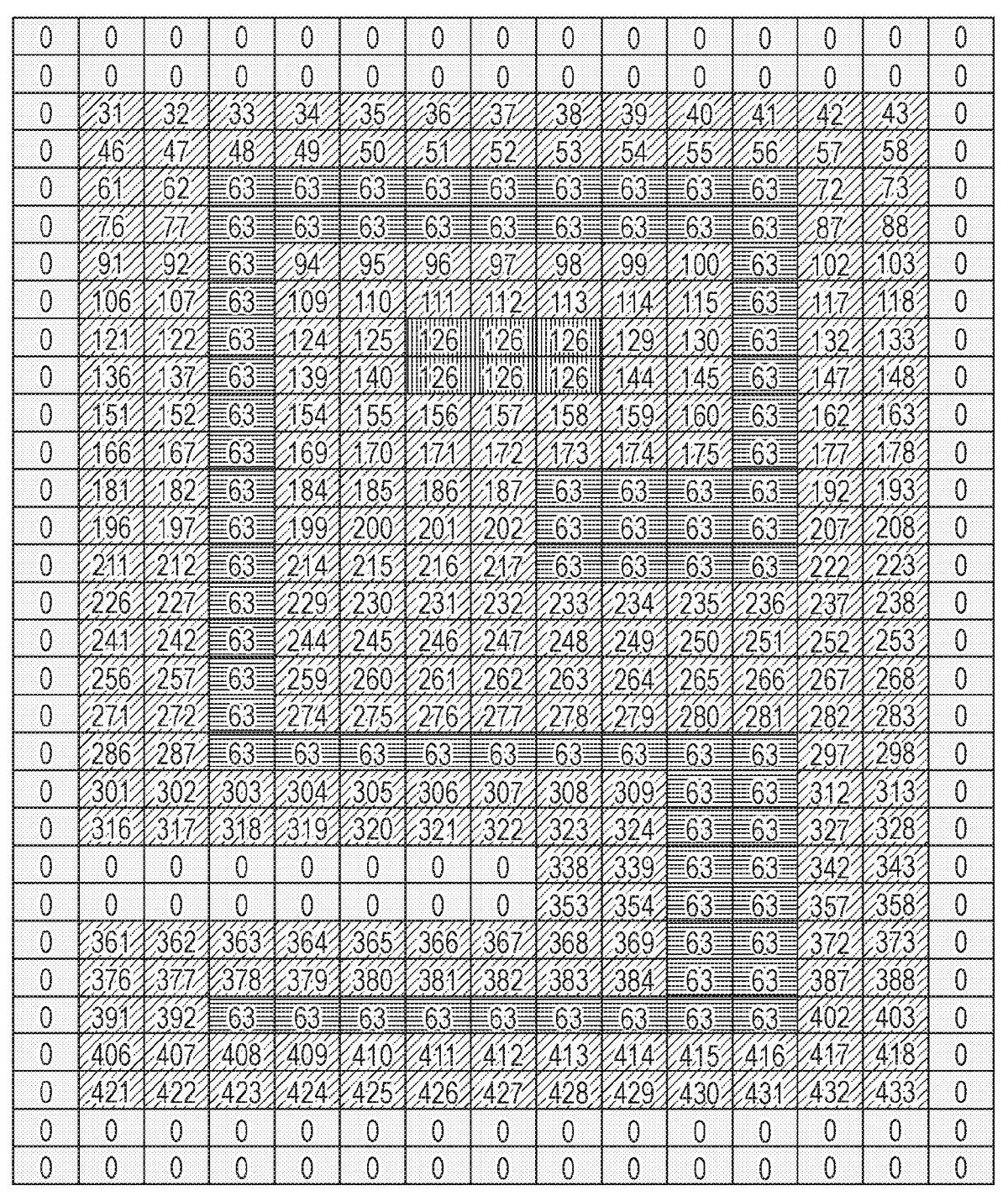

The two regions of the image are identified when the algorithm terminates, as illustrated in FIG. 6b. The number of parallel items of work is equal to the height of the image when scanning the lines and to the width of the image when scanning the lines. This may produce more than 1000 items of work in each case when processing a Full HD image (1920×1080 pixels). Scanning in all directions (left to right, right to left, from top to bottom and from bottom to top) is necessary because a change of edge index only occurs when the current pixel index is greater than the index of the preceding pixel.

When the algorithm of step (iii) explained above is complete, the next step of identifying the different regions by their properties is carried out. Preferably, step (iv) of identifying each of the different regions by their properties includes characterizing (i.e. measuring, calculating or computing) said properties. In other words, at least one property is calculated for each region, which can then be used as an identifier (or to identify) that region. An example of the properties which may be calculated for a given shape of region is shown in the following table:

TABLE 1

| Property of the Region | Computational method |
| --- | --- |
| Area | Number of pixels in the region |
| Perimeter | Number of pixels close to edges |
| Average colour | Average coulour of the pixels of the region |

TABLE 1-continued

| Property of the Region | Computational method |
| --- | --- |
| Centre | Middle coordinate (x, y) of the pixels in the region |
| Average size | Average distance of the pixels from the centre of the region |
| Average radius | Standard deviation of the distance from the pixel to the centre |

The third part of the method is step (c) of extracting data and parameters of the contiguous regions. In this step, each type of region possesses specific parameters, so that calculation of its properties is carried out depending on the type or format (e.g. shape) of the region.

Figure 7:
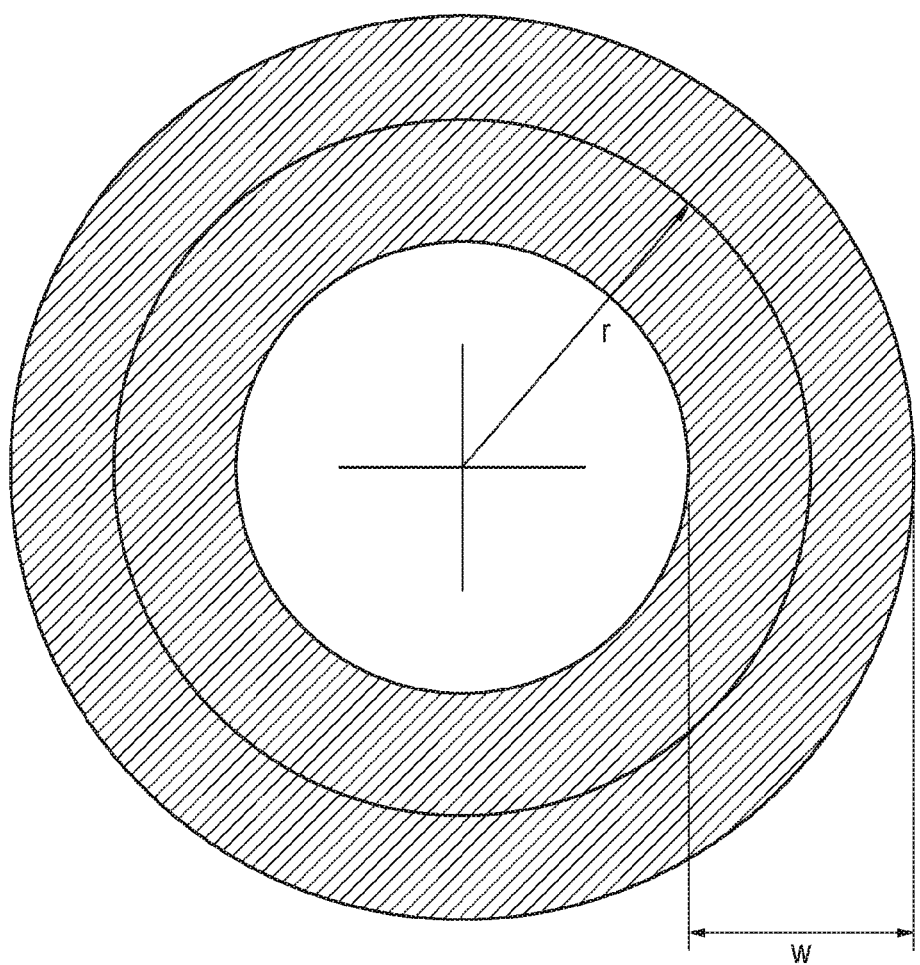
FIG. 7 shows a region of contiguous colours in a ring format.

For example, concentric regions may be made up of multiple rings of the same colour, as shown in FIG. 7. In this case, each ring has a width w and average distance to the centre r. The data for the properties of the region are presented in Table 2 below and may be used for approximating the properties of the regions in ring format. In other words, the second column of Table 2 shows the exact mathematical definition of the properties below for a ring-shaped region. Then, the third column shows how the properties are linked to the properties in Table 1, so the "computational methods" of the second column of Table 1 can be used to calculate the properties of specifically ring-shaped regions.

TABLE 2

| Property of the Ring | Exact calculation in terms of r and w | Approximation using the properties of the region |
| --- | --- | --- |
| Average distance to the centre | r | Average size |
| Width | w | Average radius |
| Area | $2\pi r \cdot w$ | Area of the region |
| Perimeter | $4\pi r$ | Perimeter of the region |

For identifying optical markers, criteria are proposed for adjacent regions to be identified and designated. The properties of the regions (such as those defined in Table 1) make it possible to decide which regions are adjacent to others, as presented in Table 3 below. That is, the properties of table 1 can be used to identify and designate adjacent regions as shown below.

Post-processing of the contiguity data (i.e. the data and parameters of the contiguous regions which are extracted) allows the creation of contiguity groups. Contiguity groups can be marked preferably with a circle of a random common colour for reasons of visualization and debugging, as shown in FIG. 8. One possible method of such post-processing is described below in step (d).

It should be emphasized that chequerboards are particular cases of adjacent regions that possess specific properties of regularity. New algorithms may take this concept as a basis for identifying other patterns of contiguity regions and to create new customized optical markers.

An example of the post-processing referred to above is the fourth part of the method is step (d) of detecting optical markers, such as targets and chequerboards, by means of a convex hull algorithm (also known as a convex wrapping algorithm) and prediction of position of squares.

In the particular case of identification of chequerboards, the identification may be carried out by counting the number of regions of contiguous colours in a group as well as by checking the regularity of the internal spaces.

In one implementation, step (d) of detecting targets and chequerboards by means of a convex hull algorithm and prediction of position of squares comprises post-processing applied to the group of adjacent regions, which locates the vertices of the chequerboard and inserts a rectangle at the cloud point, comprising the following substeps:

(i) calculating the convex hull of the centres of regions of contiguous colours grouped in the same region;

(ii) for each vertex $v_n$ in the convex hull, calculating the angle between the lines formed by $v_n \rightarrow v_{n-1}$ and $v_n \rightarrow v_{n-1}$;

(iii) ordering the vertices of the convex hull by the calculated angles; and (iv) keeping the first four vertices with the largest angles therebetween and discarding regions whose opposite angles are higher than a threshold (i.e. very different from one another). In other words, the vertices which have the largest angles between them are assumed to be at the corners of the chequerboard.

Planar chequerboards are preferably used for identifying parts of equipment of sufficiently low curvature. When there is low curvature, a marker glued on its surface would not be subjected to substantial deformations. When a chequerboard has four corner squares which are of different colours to the background colour, the corners of the chequerboard can be

TABLE 3

| Subjective criterion | Relevant properties | Approximation using the properties of the region |
| --- | --- | --- |
| Adjacent regions must be close together | Centre of the regions, average sizes and average radii | $Dist(Centre_1, Centre_2) < 14 + 2 \cdot AveSize_1 + 9.8\, AveRadius_1$<br>$Dist(Centre_1, Centre_2) < 14 + 2 \cdot AveSize_2 + 9.8\, AveRadius_2$ |
| Adjacent regions must be separate from one another (without overlap) | Centre of the regions, average sizes and average radii | $\dfrac{\max(AveSize_1, AveSize_2)}{Dist(Centre_1, Centre_2)} < 1$ |
| Geometric properties of adjacent regions must be similar | Area of the regions and perimeters | $\dfrac{\max(Area_1, Area_2)}{\min(Area_1, Area_2)} < 1.7$<br><br>$\dfrac{\max(Perimeter_1, Perimeter_2)}{\operatorname{Min}(Perimeter_1, Perimeter_2)} < 1.7$ | detected, and thus its dimensions can be determined. Preferably, all the vertices (i.e the corner squares) of the chequerboards are made up of black squares. A filter (e.g. a high contrast filter) may be used to improve the reliability of detection the corner squares of a chequerboard. This may be particularly useful when the corner squares are not black, or when the colours of the corner squares are not markedly different to the background colour.

The method according to the present disclosure may be applied in the development of systems comprising multiple calibrated cameras. This may allow extraction of normal vector data from the markers of chequerboards, ensuring that the orientation and the positioning of that component are correct.

Once the dimensions of the chequerboard are known (which may be done according to the method described above), it is possible to estimate where the centres of its internal regions are located. An analysis of the regularity of the chequerboards is carried out in groups of regions of contiguous colours, according to the following substeps:

(i) applying a convex hull algorithm using the 2D centres of the contiguous regions to find four outer squares at the edges of a chequerboard;

(ii) calculating and storing the location of fixed squares using the four outer squares as reference;

(iii) if the group of regions being analysed possesses sufficient regions, assign regions to its position on the closest chequerboard having four outer squares;

(iv) rejecting the chequerboard if more than one region is assigned to the same position.

Step (iii) is used to assign each of the regions to a respective estimated position (i.e. fixed square) on the chequerboard. Step (iii) may be omitted if sufficient regions are not present in the group. This may be the case, for example, if chequerboard regions on the marker are obscured.

Step (iv) provides a check that the four squares which were identified as outer squares of a chequerboard were correctly identified. If more than one region is assigned to the same position on the chequerboard in step (iii), this may indicate that the regions which would be mapped to the same position on the chequerboard are not in fact part of a chequerboard. This may in turn allow it to be determined that the four squares which were identified as outer squares are not in fact the four outer squares of a single chequerboard. In this case, the chequerboard is rejected.

The outer squares as referred to above may be identified by determining that they have a colour different to that of the background. They may all have the same colour, and may, for example, be four black squares as described above.

Figure 10:
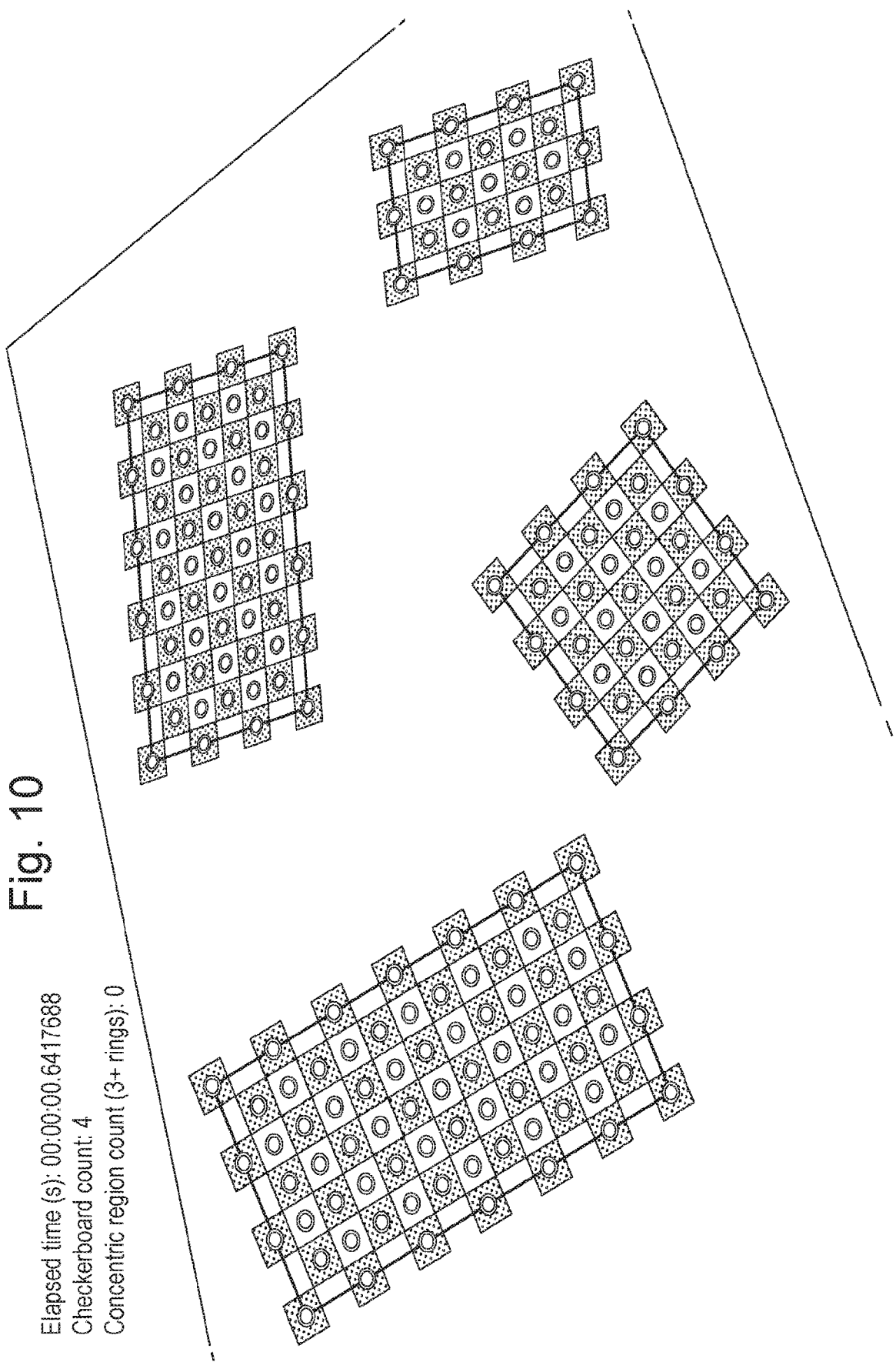

The analysis of regularity described above allows automatic identification of the dimensions of the chequerboard by successive checking of different sizes, as shown in FIGS. 9 and 10. It will be seen from these Figures that multiple targets of different types can be identified in the same image.

The analysis of regularity may also compensate partial occlusions in squares of the chequerboard. In other words, chequerboard may still be identified when some squares are not visible. Groups of adjacent regions may be subject to partial occlusions or their internal regions may not be identified properly owing to the conditions of luminosity. In these cases, comparing the centres of the regions effectively identified with the expected positions of the squares allows recognition of the chequerboard even when various squares are not identified, provided the four black squares of the vertices (i.e. corners) are visible.

Figure 11:
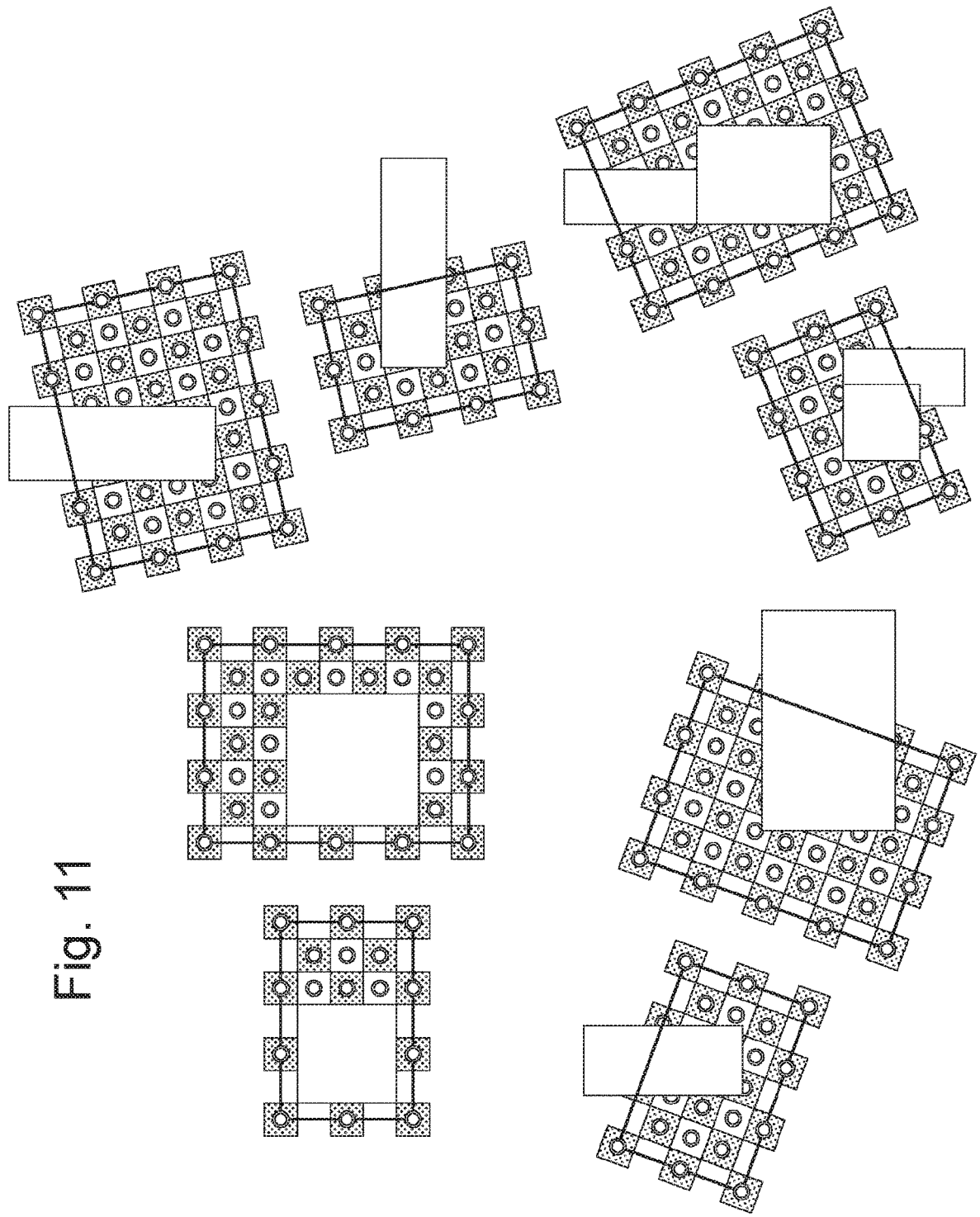
FIG. 11 shows examples of occlusion patterns in which identification of the chequerboard will still take place successfully by the method of the present disclosure.

The analysis of regularity will accept (i.e. be able to detect) chequerboards even if not all the positions envisaged on the board are occupied by a colour region. FIG. 11 shows examples of occlusion patterns (represented as overlaid squares) in which identification of the board will still take place successfully. This is because the squares at the corners of the chequerboard can be detected, and the overall shape and dimensions can be determined, despite some of the individual square regions of the chequerboard being obscured.

In the case of identification of target-shaped markers that comprise concentric circles (rather than chequerboards), specific properties of regions of contiguous colours are employed for this type of marker, as presented in Table 4 below. It will be understood that the below properties allow ring-shaped regions to be identified, which in turn may allow the central circular region of a target-shaped marker.

TABLE 4

| Subjective criterion | Relevant properties | Mathematical implementation |
|---|---|---|
| Adjacent regions must appear as a circular ring | In a circular ring there is a constant. (Perimeter × Width)/ Area = 2 | $\dfrac{Perimeter \cdot AveRadius}{Area} < 3$ |
| In a circular ring typically r > w | Properties of circular rings: r, w | $\dfrac{AveSize}{AveRadius} < 0.5$ |
| Adjacent centres of rings that make up concentric regions must be close together | Distance between centres of regions and their respective widths | $\dfrac{Dist(Centre_1, Centre_2)}{(\min(AveRadius_1, AveRadius_2))} < 1.3$ |
| Widths of adjacent rings must be substantially equal | Width w of the regions | $\dfrac{|AveRadius_1 - AveRadius_2|}{Min(AveRadius_1, AveRadius_2)} < 1.5$ |

Figure 12:

After identification of the regions of contiguous colours, it is possible to extract and store data of the region, such as which pixels belong to each region (list of [x,y] coordinates) and, from there, calculate the parameters presented in Table 1. By combining these parameters it is possible to identify targets (concentric regions—rings of the same colour whose centres are close together, as shown in FIG. 12) and adjacent regions (adjacent colour regions without overlap whose properties are substantially equal). Targets are identified by a sequence of characters relating to the sequence of colours thereof, according to the following index: W: white; P: black; R: red; G: green; B: blue; ?: colour unknown (not identified as W, P, R, G or B).

For example, a sequence RWP?G signifies that the colour of the innermost region is red, followed by white, black, unidentified colour and green. FIGS. 12 and 13 show results of the proposed algorithm.

Thus, the method of the present disclosure allows identification of markers, such as chequerboards and targets comprising concentric circles, unequivocally and with sufficient robustness, even in the situation of partial occlusions and/or variations of illumination.

Numerous variations falling within the scope of protection of the present application are permitted. This reinforces the fact that the present invention is not limited to the particular configurations/embodiments described above.

Modifications of the above-described apparatuses and methods, combinations between different variations as practicable, and variations of aspects of the invention that are obvious to those of skill in the art are intended to be within the spirit and scope of the claims.

The invention claimed is:

1. Method for optical recognition of optical markers comprising the steps of:
    acquiring an image;
    identifying regions of contiguous colours in the image by flood filling;
    extracting data and parameters of the contiguous regions; and
    detecting an optical marker by a convex hull algorithm and prediction of position of squares based on the data and parameters extracted from the contiguous regions;
    wherein the step of detecting the optical marker further comprises an analysis of regularity of chequerboards, comprising at least one of the following substeps:
        (i) applying a convex hull algorithm using the 2D centres of the contiguous regions to find four outer squares at the edges of a chequerboard;
        (ii) calculating and storing the location of fixed squares using the four outer squares as reference;
        (iii) if the group of regions being analysed possesses sufficient regions, assigning regions to positions on the closest chequerboard having four outer squares;
        (iv) rejecting the chequerboard if more than one region is assigned to the same position.

2. Method according to claim 1, wherein the optical marker is a chequerboard.

3. Method according to claim 1, wherein the step of identifying regions of contiguous colours in the image comprises the following substeps:
    applying at least one filter to the image;
    detecting edges in the image so as to separate the different regions of contiguous colours;
    carrying out the filling of the separated regions using flood filling; and
    identifying each of the different regions of contiguous colours by their properties.

4. Method according to claim 3, wherein the substep of carrying out filling of the separated regions comprises at least one of the following substeps:
    receiving an edge map;
    creating a map of colour regions;
    initializing the map of colour regions by assigning an index to each pixel, the index being a number representing a colour; and
    performing the following steps, until the map of colour regions remains unchanged:
        (i) scanning the map of colour regions from left to right, from right to left, from top to bottom and from bottom to top in parallel, in any order;
        (ii) if the pixel is not located within any edge and its index is greater than that of the preceding pixel, giving the present pixel the same index as the preceding pixel.

5. Method according to claim 1, to wherein the step of detecting the optical marker comprises at least one of the following substeps:
    (i) calculating the convex hull of the centres of regions of contiguous colours grouped in the same region;
    (ii) for each vertex Vn in the convex hull, calculating the angle between the lines formed by Vn→Vn-1 and Vn→Vn-1;
    (iii) ordering the vertices by the calculated angles; and
    (iv) keeping the four vertices with the largest angles therebetween and discarding regions whose opposite angles are higher than a threshold.

6. Method according to claim 1, wherein the four outer squares are of the same colour, preferably wherein the four outer squares are black.

7. Method for optical recognition of optical markers comprising the steps of:
    acquiring an image;
    identifying regions of contiguous colours in the image by flood filling;
    extracting data and parameters of the contiguous regions; and
    detecting an optical marker based on the data and parameters extracted from the contiguous regions by combining the parameters in order to identify an optical marker, the optical marker being a target comprising a plurality of concentric circles;
    wherein the step of detecting the optical marker further comprises an analysis of regularity of chequerboards, comprising at least one of the following substeps:
        (i) applying a convex hull algorithm using the 2D centres of the contiguous regions to find four outer squares at the edges of a chequerboard;
        (ii) calculating and storing the location of fixed squares using the four outer squares as reference;
        (iii) if the group of regions being analysed possesses sufficient regions, assigning regions to positions on the closest chequerboard having four outer squares;
        (iv) rejecting the chequerboard if more than one region is assigned to the same position.

8. Method according to claim 7, further comprising a assigning a letter to each of the contiguous regions to identify the sequence of colours of the plurality of concentric circles.

* * * * *